(12) United States Patent  
Guo et al.

(10) Patent No.: US 8,115,874 B2  
(45) Date of Patent: Feb. 14, 2012

(54) MEMORY OPTIMIZATION FOR VIDEO PROCESSING

(75) Inventors: Shaori Guo, San Jose, CA (US); Selliah Rathnam, Pleasanton, CA (US); Gwo Giun Lee, San Jose, CA (US)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 754 days.

(21) Appl. No.: 11/575,487

(22) PCT Filed: Sep. 16, 2005

(86) PCT No.: PCT/IB2005/053053  
§ 371 (c)(1),  
(2), (4) Date: Nov. 21, 2008

(87) PCT Pub. No.: WO2006/030400  
PCT Pub. Date: Mar. 23, 2006

(65) Prior Publication Data  
US 2011/0099330 A1   Apr. 28, 2011

Related U.S. Application Data

(60) Provisional application No. 60/610,754, filed on Sep. 16, 2004, provisional application No. 60/639,227, filed on Dec. 23, 2004.

(51) Int. Cl.  
*H04N 9/64* (2006.01)

(52) U.S. Cl. ........ 348/716; 348/452; 348/448; 348/567; 348/699; 348/700; 365/49.1; 365/78; 365/189.2; 365/174; 365/185.03; 365/208; 365/148

(58) Field of Classification Search .................. 348/716, 348/452, 699, 700, 448, 567, 416; 365/185.03; 365/182, 174  
See application file for complete search history.

(56) References Cited

U.S. PATENT DOCUMENTS

| | | | | |
|---|---|---|---|---|
| 4,827,350 A * | 5/1989 | Kobayashi et al. | ........... | 358/494 |
| 5,029,079 A * | 7/1991 | Magar et al. | ................. | 708/404 |
| 6,731,338 B1 * | 5/2004 | Lin | ............................... | 348/323 |
| 6,917,062 B2 * | 7/2005 | Natori | ........................... | 257/295 |
| 6,937,291 B1 * | 8/2005 | Gryskiewicz | ................ | 348/581 |
| 2003/0007384 A1 * | 1/2003 | Shimizu | ................... | 365/185.03 |
| 2003/0095194 A1 * | 5/2003 | Suzuki et al. | ............ | 348/231.99 |
| 2003/0097524 A1 * | 5/2003 | Brant et al. | .................... | 711/114 |
| 2003/0151673 A1 * | 8/2003 | Hashimoto et al. | ........ | 348/220.1 |
| 2003/0174116 A1 * | 9/2003 | Maeda et al. | ................... | 345/98 |
| 2003/0210567 A1 * | 11/2003 | Koll et al. | ..................... | 365/174 |
| 2004/0062454 A1 * | 4/2004 | Komiya et al. | ............... | 382/284 |

* cited by examiner

*Primary Examiner* — Jefferey Harold  
*Assistant Examiner* — Mustafizur Rahman  
(74) *Attorney, Agent, or Firm* — DLA Piper LLP (US)

(57) ABSTRACT

Memory storage requirements for digital signal processing operations, for example, motion-compensated video scan rate conversion, that produce intermediate output data, which is then used as an input to the operation, are reduced by reordering operations and organizing memory allocations in a special manner to allow intermediate output at a particular execution time, to substantially share the same memory space as the intermediate output of a previous execution time. Such a reduction in the amount of memory required for processing operations advantageously reduces cost and power consumption.

12 Claims, 5 Drawing Sheets

MEMORY OPTIMIZATION FOR VIDEO PROCESSING

CROSS REFERENCE TO RELATED APPLICATION

This application claims the benefit of U.S. provisional application Ser. No. 60/610,754 filed Sep. 16, 2004, and 60/639,227 filed Dec. 23, 2004 which is incorporated herein whole by reference.

The present invention relates generally to methods and apparatus for video processing, and more particularly relates to reducing memory usage for motion-compensated video scan-rate conversion.

Advances in semiconductor manufacturing technology and digital system architecture have resulted in very highly integrated circuits, which contain millions of transistors, along with various other components and interconnections. The integrated circuits that result from the aforementioned advances provide significant computational resources at relatively low costs. In turn, the availability of such integrated circuits has given rise to growth in the capabilities and varieties of consumer electronic products. One particular aspect of consumer products is video processing.

Because of the ever-increasing demand for improved video quality, more and more complex technologies have been employed in state-of-the-art products that incorporate, or include, video processing functionality, or capability. Use of these complex technologies often results in undesirable consequences in terms of both cost and power consumption. For example, such video processing capabilities typically require a large amount of memory in which to store video data, and further typically require fast computational resources. Both the extra memory and the high speed computational resources add to the cost and the power consumption of the products into which the video processing capabilities are incorporated.

The required amount of memory has become particularly large in some of the sophisticated processing algorithms that operate on several input video fields and produce several output video fields, including fields that are intermediate results, which are stored for subsequent processing.

What is needed are methods and apparatus for providing video processing capabilities while reducing the cost and power consumption of the products in which such capabilities are incorporated.

Briefly, memory storage requirements for multi-step digital signal processing operations, for example, motion-compensated video scan rate conversion, that produce intermediate output data, which is then used as an input to a next step of the signal processing operation, are reduced by reordering operations and organizing memory allocations in a special manner to allow intermediate output at a particular execution time, to substantially share the same memory space as the intermediate output of a previous execution time.

Figure 1:
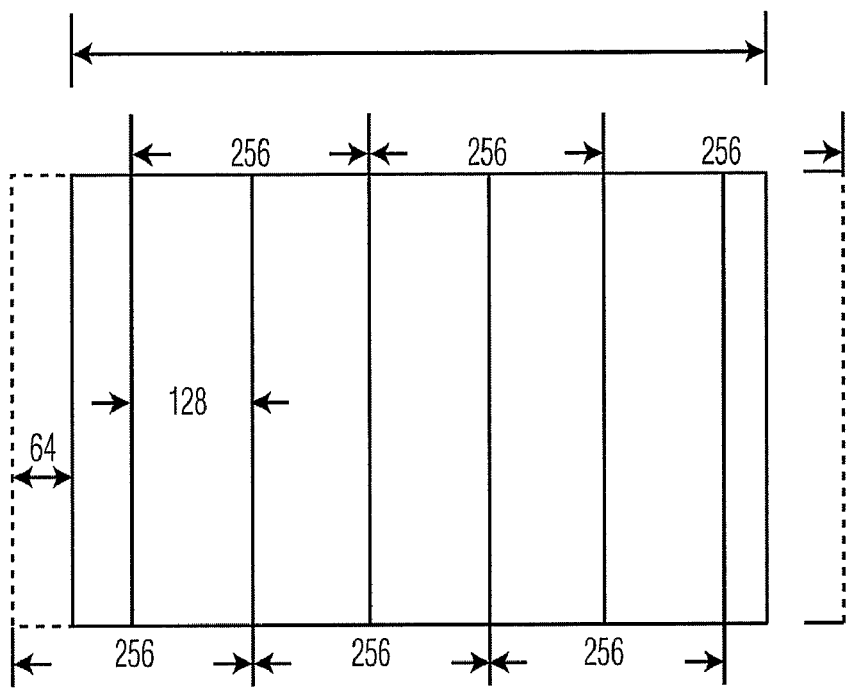

FIG. 1 illustrates a column division for an input video field, wherein the dark and solid frame indicates an original video field, 720 pixels wide, in memory. It is logically divided into 6 columns each 256 pixels wide, and there is a 128 pixel overlapping per line between two neighboring columns as shown. The dashed lines show the extension of the original video field on the left and right sides. The extended pixels have a constant value, either 0 or 255, and thus are not saved in the memory.

Figure 2:
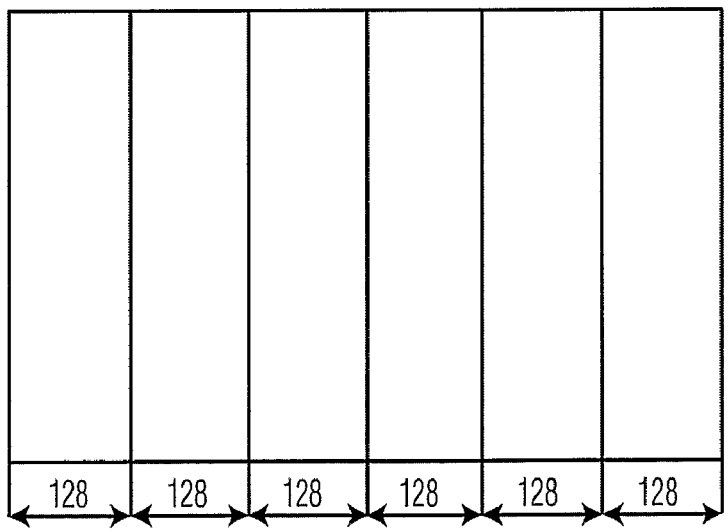

FIG. 2 illustrates a column division for an output video field, wherein it is divided into 6 columns each 128 pixels wide. There is no overlapping of, or gaps between, the neighboring columns.

Figure 3:
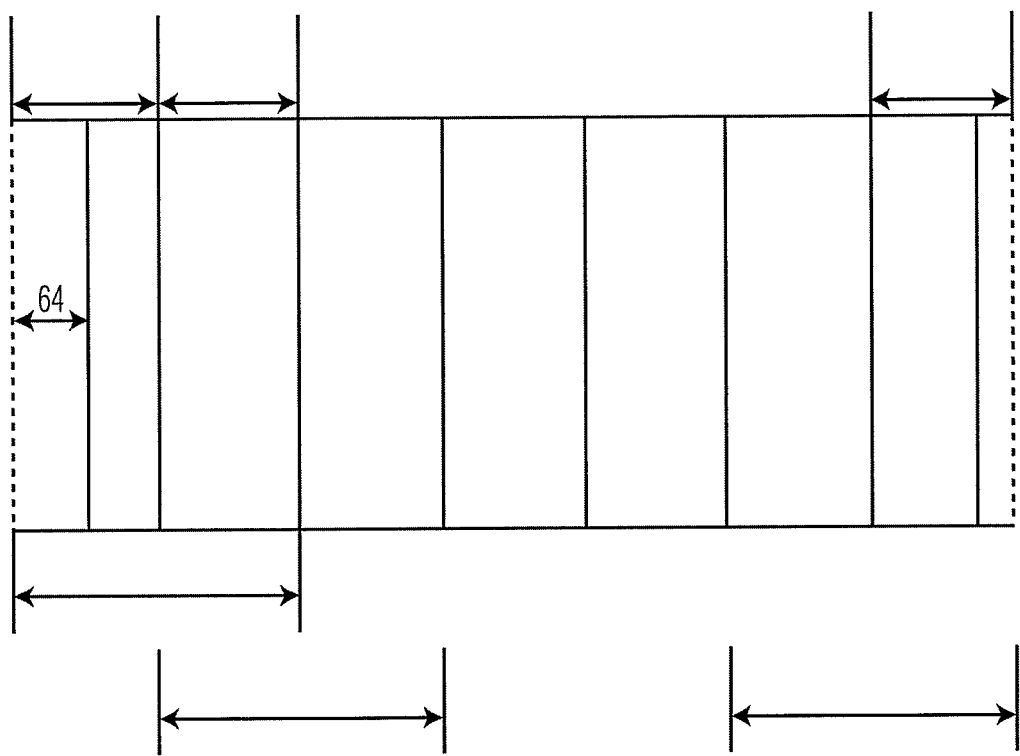

FIG. 3 illustrates a memory mapping (in a forward scanning mode) of video fields $V_{in2}(t)$ and $V_{out0}(t)$, which share the same memory area, wherein the starting location of $V_{out0}(t)$ is shifted by 64 pixels to the left of input field $V_{in2}(t)$ (highlighted by the solid and dark frame), so the first column of the output field does not overwrite the second column of the input field before the input field is processed.

Figure 4:
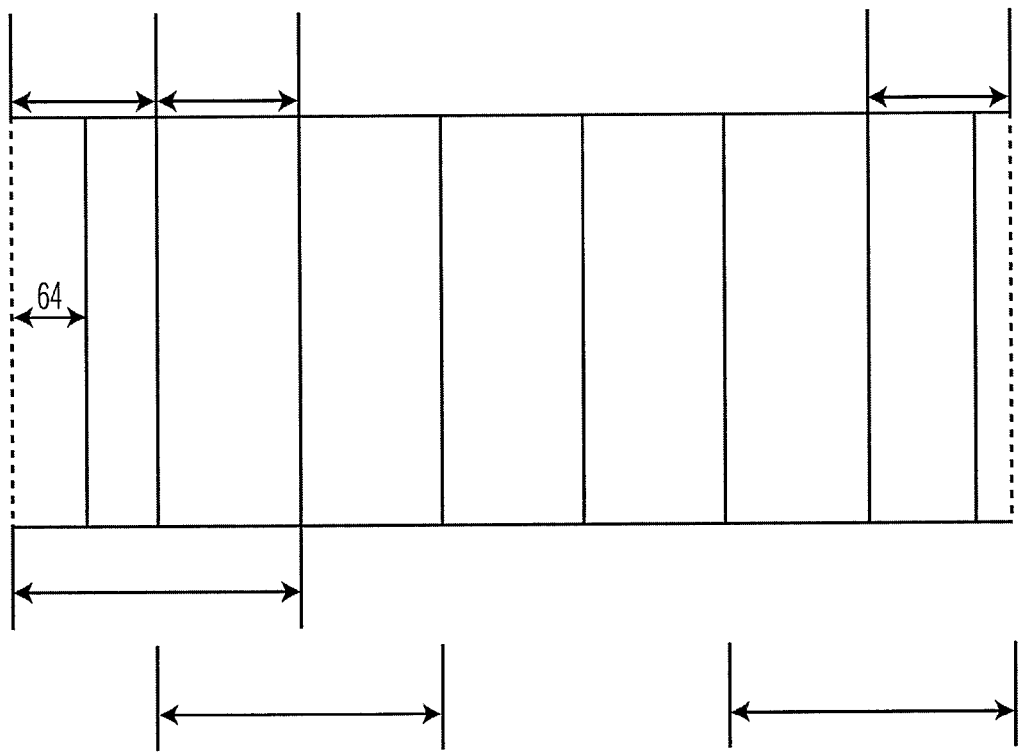

FIG. 4 illustrates a memory mapping that is similar to that shown in FIG. 3, but which shows the relative memory location between input field $V_{in3}(t)$ and output field $V_{out1}(t)$ in the forward scanning mode.

Figure 5:
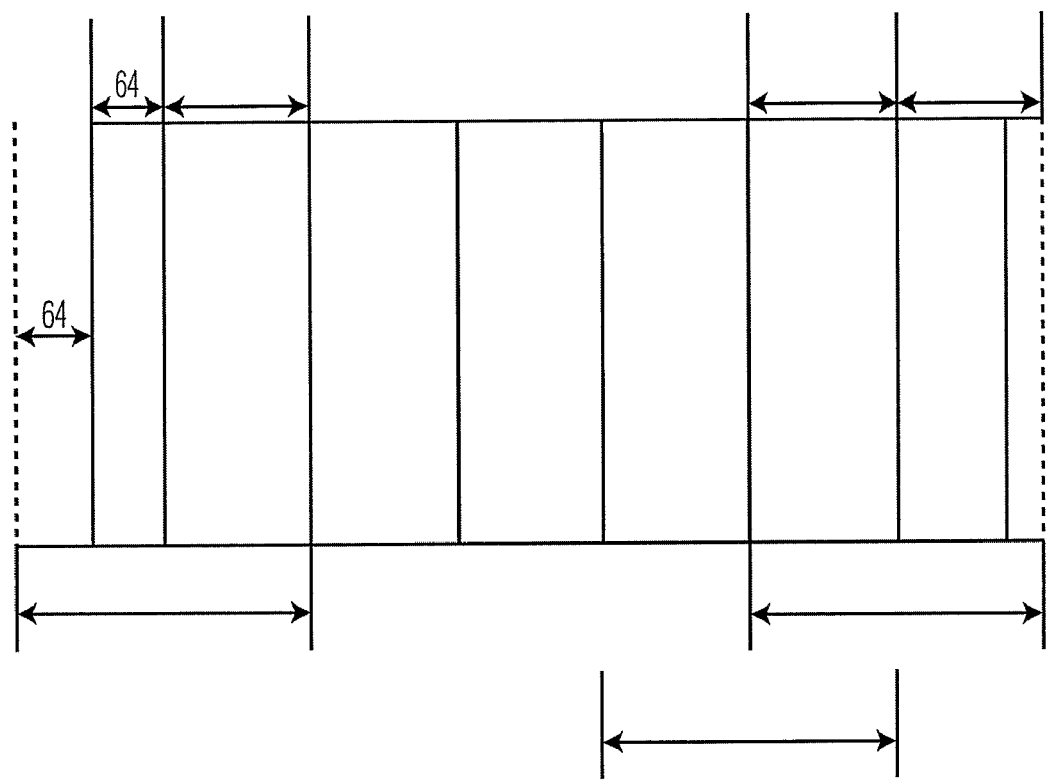

FIG. 5 illustrates a memory mapping (in a reverse scanning mode) of fields $V_{in2}(t)$ and $V_{out0}(t)$, which share the same area of memory, wherein column 6 is processed first, followed by the processing of column 5, and column 1 is processed last. Column 6 of field $V_{out0}(t)$ starts in such a location that the first column of $V_{out0}(t)$ is shifted by 64 pixels to the right of the first column of field $V_{in2}(t)$.

Figure 6:
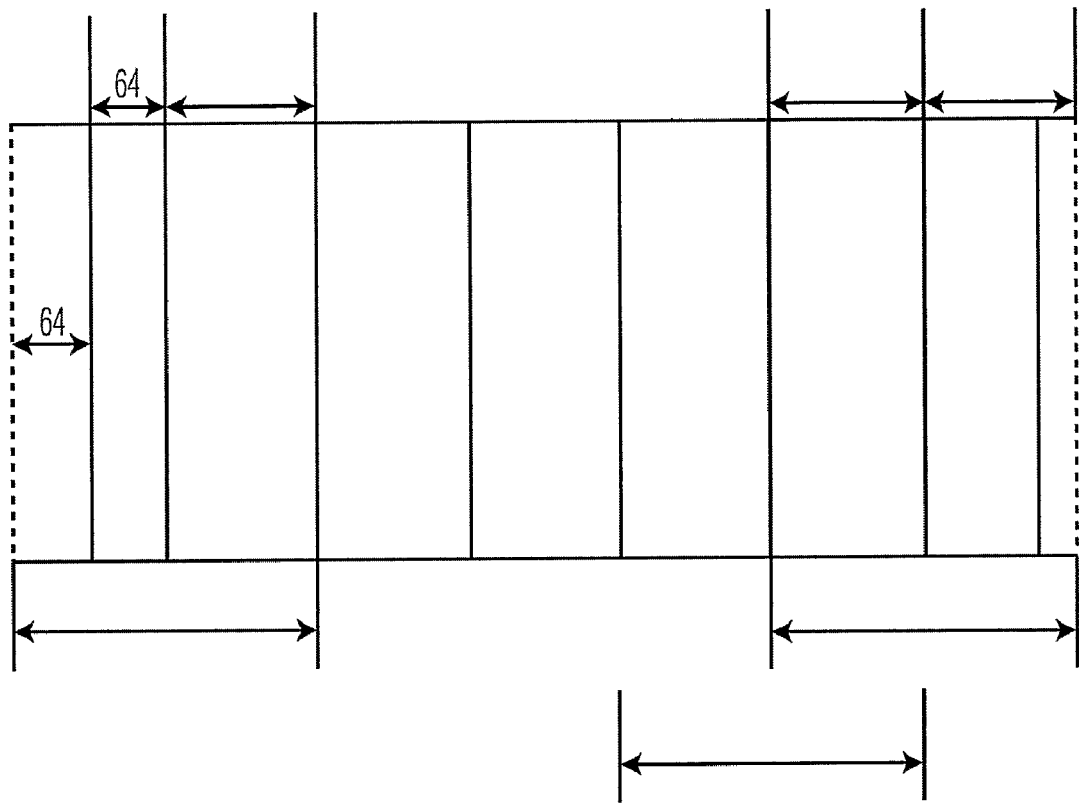

FIG. 6 illustrates a memory mapping of input field $V_{in3}(t)$ and output field $V_{out1}(t)$ in the reverse scanning mode, wherein the intermediate output field is shifted by 64 pixels to the right side of the input field.

Generally, the present invention relates to reducing, or optimizing, the memory requirements for digital signal processing with recursive algorithms, and more particularly relates to reducing the memory requirements for video scan-rate conversion. One benefit of reducing, or optimizing, the memory requirements includes reduced system cost and lower power consumption. It is noted that the memory used can be included with, i.e., internal to, the circuitry used for processing, or the memory may be external to such processing circuitry.

In one illustrative embodiment of the present invention, for a video image size of 720*576, 91% of the memory that is otherwise required to store the intermediate video data can be eliminated from the system, or can be otherwise allocated within the system. Such memory saving is achieved at almost no additional hardware or design cost. Reduction of the required amount of memory does not affect the quality of video output produced by processing in accordance with the present invention. In addition to the illustrative motion-compensated video scan-rate conversion process described below, methods in accordance with the present invention can also be included in general DSP applications, which employ recursive algorithms and require a large amount of memory to store intermediate data.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

The adjective, "approximately", is used herein to mean that the values specified in conjunction therewith are nominal values, and may actually above or below the specified value by an amount within commonly found tolerances due to the manufacturing of the described apparatus. The symbol "~" is used herein to mean approximately.

Motion-compensated video scan-rate conversion refers to a process consisting of both motion estimation (ME) and motion compensation (MC). While motion estimation is the process of extracting the motion vectors of a video field, motion compensation refers to the process of applying the motion vectors to generate a video field or frame.

With respect to the processing of digitized video data, it will be appreciated that such video data is typically in stored in an addressable memory such as, for example, a static random access memory (SRAM) or a dynamic random access memory (DRAM). It will be further appreciated by those skilled in the art and having the benefit of this disclosure, that regardless of the physical arrangement of the memory, and regardless of the physical addressing scheme that is used, it is helpful to describe the stored video data in terms of a logical arrangement, or representation, of the data. A typical logical arrangement for video data is one in which such an arrangement is representative of the layout of a display screen on which the video data will be presented. For example, video data may be logically represented as consisting of a video field, with each field containing a certain number of lines, and each line containing a certain number of pixels. With such a logical representation of video data, wherein the logical representation matches the physical display on which it will be viewed, processing operations on that video data can be expressed, or described, in terms reflective of the layout of a display screen, such as "left" and "right", and "top" and "bottom". One way to organize the addressing of these fields of video data is as memory arrays. The video data may thought of as occupying a two-dimensional array that corresponds to a display screen. In such an arrangement, the address of the memory location where the pixel data corresponding to the leftmost pixel of the top line of the display, may be mapped to a screen address, for example (0,0), if screen addressing begins in the upper left-hand corner of the display screen. Logical operations of the video data may then be described in terms of display screen locations rather than in terms of actual physical memory addresses. It is also noted that mapping between physical and logical addresses is well-known in this field, and therefore the details thereof will not be further described herein.

It will be appreciated that each pixel may be represented by an arbitrary number of bits or bytes, although some common arrangements include representing a pixel with eight bits of data (one byte) or with 32 bits of data (four bytes).

Generally, scan-rate conversion is a process of either changing (e.g., increasing or decreasing) the number of pixel lines per video field, changing the number of fields per video sequence, or changing both the number of pixel lines per video field and the number of fields per video sequence simultaneously. Motion compensated scan-rate conversion is currently one of the most advanced techniques in video scan-rate conversion. It performs scan-rate conversion using motion information embedded in a video sequence and extracted by the aforementioned motion estimation (ME) process.

Typically, motion compensated scan-rate conversion delivers better video quality than its non-motion compensated counterparts. However, largely due to its complexity, it requires fast computational resources and a large amount of memory to store video data, both of which result in higher power consumption and higher cost.

Motion-compensated scan-rate conversion is performed on a per-input-video-field basis. That is, the motion compensation process is executed once every time a new field of video data is received. In an illustrative embodiment of the present invention, each execution takes four fields of video data as input: two of these video fields are external inputs that are received either from a video input device or from the output of other video processors; and the other two are recursive input generated internally by the previous execution. Although four fields of video data are used in the illustrative embodiment described herein, it is noted that the present invention is suitable for use in video processing applications in which more or fewer video fields are used.

Each execution generates four fields of video data: two of these video output fields are motion-compensated video output; and the other two are intermediate video output data that are used as the recursive input for the next execution.

For ease of explanation, let us use functions $V_{in0}(t)$, $V_{in1}(t)$, $V_{in2}(t)$ and $V_{in3}(t)$ to represent these four input fields respectively. All these functions have a variable t denoting the execution time at which these fields are taken as input. Function $V_{in0}(t)$ represents an external input field received at execution time t, and $V_{in1}(t)$ is also an external input field but is on which has been received at the immediately previous execution time, t−1. Functions $V_{in2}(t)$ and $V_{in3}(t)$ are recursive input fields generated at the previous execution time, t−1.

In accordance with the definitions above, the input fields at previous execution time, t−1, can be denoted as $V_{in0}(t-1)$, $V_{in1}(t-1)$, $V_{in2}(t-1)$ and $V_{in3}(t-1)$.

Similarly, let us denote the video data output fields as functions of time. The four output fields produced at execution time t are: $V_{out0}(t)$, $V_{out1}(t)$, $V_{out2}(t)$ and $V_{out3}(t)$, where $V_{out0}(t)$ and $V_{out1}(t)$ are intermediate output to be used as the recursive input fields at the next execution time, t+1, while $V_{out2}(t)$ and $V_{out3}(t)$ are the motion-compensated output at execution time t.

Following the definitions above, the output fields at the previous execution time, t−1, can be denoted as $V_{out0}(t-1)$, $V_{out1}(t-1)$, $V_{out2}(t-1)$ and $V_{out3}(t-1)$, respectively.

Mathematically, the relationship between the input and output fields at execution times t and t−1, where t≧1, can be expressed by the following equations:

$$V_{in1}(t)=V_{in0}(t-1)$$

$$V_{in2}(t)=V_{out0}(t-1)$$

$$V_{in3}(t)=V_{out1}(t-1)$$

For motion-compensation, video input and output data are normally stored in external memories, that is, memories which are external to the chip or chips that perform the substantial portion of the computations associated with the motion-compensated video scan-rate conversion process. It is noted that even if the video input and output data are stored in an on-chip memory, although rare in real applications due to its high cost, the present invention can still be applied. Since there are eight fields of input/output video data required in each execution, conventional motion-compensation algorithms require a memory that can accommodate eight fields of video input and output data simultaneously. Various embodiments of the present invention reduce the amount of memory needed for motion-compensated video scan-rate conversion.

In one illustrative motion-compensated video scan-rate conversion apparatus, a column-based approach is employed. In a column-based approach, a video field is logically divided into a number of columns and the apparatus processes these columns one by one. The width of an input column and the width of an output column are different. Although a method in accordance with the present invention is not limited to a particular size for the input and output columns, the following typical values will be assumed for ease of discussion: an output column that is 128 pixels wide, and an input column that is 256 pixels wide.

Motion-compensation algorithms require that the leftmost input column extend the original video field by 64 pixels on the left side. Further, if the last column of the original video field is not as wide as 256 pixels, the right side of the video field is extended to make the last column 256 pixels wide.

FIG. 1 shows an example of how an input field that is 720-pixels wide, is divided into six input columns. Referring to FIG. 1, the dark and solid frame indicates an original video field, which is 720 pixels wide, in external memory. It is logically divided into 6 columns that are each 256 pixels wide. There is an overlapping of 128 pixels per line between two neighboring columns as shown in FIG. 1. The dashed lines show the extension of the original video field on the left and right sides. The extended pixels have a constant value, either 0 or 255, and thus are not saved in the external memory. Between two neighboring output columns, however, there is no overlapping. The column division for an output field is depicted in FIG. 2. Referring to FIG. 2, it can be seen that the output field is divided into 6 columns, each 128 pixels wide. There is no overlapping of, or gaps between, the neighboring columns.

The order of processing, also known as scanning mode, of conventional motion-compensation algorithms is always from column 1 to column 2, to column 3, and so on until the last, or rightmost, column is processed.

The following explanation briefly describes how video data are fetched and stored when a column is conventionally processed. Video data are fetched from and stored to external memory line by line in sequential order. Sequential order means that when the motion-compensation process fetches or stores a line of video data, the next line it fetches or stores is the one at the next higher, adjacent memory address (i.e., the logical address for the next sequential line of the video field). Assume that the motion-compensation process operates on column K. At the beginning of the operation, the motion-compensation process fetches the first 24 lines of column in each of the four input fields (i.e., $V_{in0}(t)$, $V_{in1}(t)$, $V_{in2}(t)$ and $V_{in3}(t)$) from the external memory and saves them in a local buffers where the video data are processed. The motion-compensation process subsequently generates the first two lines of column for each of the four output fields (i.e., $V_{out0}(t)$, $V_{out1}(t)$, $V_{out2}(t)$ and $V_{out3}(t)$). The output video data are saved back to the external memory at the locations designated for these four video output fields to be stored. After the first two lines are produced for each output field, the motion-compensation process fetches two lines from each input field at a time, and produces two output lines for each output field accordingly. This process continues until the whole column is processed. When the processing of one column is completed, the motion-compensation process operates upon the next column. This is repeated until all of the columns in the input fields have been processed.

As described in greater detail below, embodiments of the present invention provide a different approach to the scanning mode, and a new way to store video data in memory.

As noted above, conventional algorithms, which use a simple and straightforward approach to storing video input and output data, require eight field memories to store the four input fields and four output fields. Various embodiments of the present invention reduce the amount of memory needed for motion compensation by making the two intermediate output fields (i.e., $V_{out0}(t)$ and $V_{out1}(t)$) and the two recursive input fields (i.e., $V_{in0}(t)$ and $V_{in1}(t)$) share the same regions of memory. For conventional motion compensation algorithms using a single scanning mode, however, it is impossible to share memory among the recursive input and intermediate output fields, because the intermediate output fields would always overwrite the recursive input fields before the recursive input fields are processed.

In order for the intermediate output fields to share the memory of the recursive input fields without overwriting the input fields before the input fields are processed, embodiments of the present invention provide a scheme of alternating scanning direction that uses a forward scanning mode and a reverse scanning mode alternately.

In the forward scanning mode, the motion compensation process begins operating on the leftmost column, and ends its operation at the rightmost column. In reverse scanning mode, the motion compensation process operates on the rightmost column first, and continues in a right-to-left order completing its processing with the leftmost column.

Alternating scanning modes means that if at execution time t, the scanning is in forward mode, then at execution t+1, the scanning will be in reverse mode. The scanning is in forward mode again at execution t+2, and so on. However, alternating the scanning modes alone cannot prevent the intermediate output fields from overwriting the recursive input fields before the recursive input fields are processed. In an illustrative embodiment of the present invention, the intermediate output field is stored in the memory such that the intermediate output field is shifted by 64 pixels to the left of the recursive input fields.

FIGS. 3 and 4 show the relative memory location between the recursive input and intermediate output fields in the forwarding scanning mode. The intermediate output $V_{out0}(t)$ and the recursive input $V_{in}(t)$ share the same field memory, and the starting location of the output field is 64 pixels to the left side of the original input. To see how this works, let us consider the motion compensation process operating on the first column. The first 24 lines of column 1 of $V_{in2}(t)$ are first loaded to a buffer where video data are processed. The first two lines of column 1 of $V_{out0}(t)$ are then produced and saved back to the external memory. As shown in FIG. 3, the starting location of $V_{out0}(t)$ is deliberately shifted by 64 pixels to the left of the video field $V_{in2}(t)$, so that the first column of $V_{out0}(t)$ does not overwrite the second column of $V_{in2}(t)$, which needs to be processed following the processing of the first column.

Examples, in accordance with the present invention, of memory mappings of the motion compensation process in reverse scanning mode are shown in FIGS. 5 and 6. In reverse scanning mode, column 6 is processed first, followed by the processing of column 5. Column 1 is processed last. When storing field $V_{out0}(t)$ to the external memory, column 6 starts in such a location that the first column of $V_{out0}(t)$ is shifted by 64 pixels to the right side of the first column of field $V_{in2}(t)$. This is to make sure that output column of field $V_{in2}(t)$ does not overwrite input column of field before the input column is processed. This makes it possible for intermediate output field $V_{out0}(t)$ and recursive input field $V_{in2}(t)$ share the same memory area.

From the foregoing it can be seen that the present invention provides methods of storing and retrieving intermediate data for processing that includes recursive use of the intermediate data. Such methods may include determining the memory addresses for a video field stored in a memory; determining the memory addresses for each of a plurality of input columns, the input columns having a first width, the input columns at least partially overlapping the video field; determining the memory addresses for each of a plurality of output columns, the output columns having a second width, the output columns at least partially overlapping the video field; reading a first set of input data from a first input column; producing a first set of output data based at least in part upon the first set of input data; and writing the first set of output data to the first output column; wherein the width of the second width is less than the first width, and the first output column overlaps a portion of the first input column.

It will be appreciated the present invention may be practiced with information processing configurations other than those described above. With respect to video processing systems for example, there are a number of parameters that can be varied within the scope of the present invention. Such parameters include, but are not limited to, the number of bytes per pixel, the number of pixels per line, the number of lines per field, the number and width of input columns, the input column overlap width, the number and width of output columns, the size of the left-side extension of the input field, the size of the right-side extension of the input field, the number of fields of input data, and the number of fields of output data.

The amount of memory that can be saved through embodiments of the present invention can be calculated by comparing the amount of memory required to store the intermediate output fields conventionally with the amount of memory required to store the intermediate output in accordance with the present invention. The amount of memory required to store other fields of input and output video data remain the same. It is noted that the amount of memory saving is dependent on the size of the video field.

Using a conventional approach with a video field size of 288 lines by 720 pixels, the amount of memory required to store the two intermediate output fields is 2*720*288=414,720 bytes, assuming that each pixel is one 8-bit byte. In embodiments of the present invention, the only extra memory required to store the intermediate output fields are due to the 64 pixel left-shifting and 64 pixel right-shifting. The extra amount of memory required can be calculated as 2*64*288=36,864 bytes. Therefore, the amount of memory saving is 414,720−36,864=377,856 bytes when the field size is 288 lines by 720 pixels, with each pixel being one byte. The saving in percentage is thus: 377,856/414,720*100%=91.11%.

Various embodiments of the present invention include methods and apparatus for external memory optimization in video signal processing in general, and motion-compensated video scan-rate conversion in particular. Memory optimization in accordance with the present invention acts to reduce cost and to reduce power consumption by reducing the required amount of external memory.

An advantage of embodiments of the present invention is that the memory saving is achieved at almost no extra hardware or design cost.

Another advantage of embodiments of the present invention is that the memory saving does not affect the video processing quality.

It is noted that reduction of memory requirements in accordance with the present invention may also be applied to general digital signal processing (DSP) applications that employ recursive algorithms and require large amounts of memory to store intermediate data.

It is to be understood that the present invention is not limited to the embodiments described above, but encompasses any and all embodiments within the scope of the subjoined claims and their equivalents.

What is claimed is:

1. A method of digital signal processing, comprising: reading a first set of input data from a first memory array; processing the first set of input data to produce a first set of intermediate data; writing the first set of intermediate data to a second memory array; wherein a first portion of the second memory array overlaps a first portion of the first memory array, a second portion of the second memory array does not overlap the first memory array, and the first set of intermediate data is written to a portion of the second memory array that overlaps a portion of the first memory array from which at least a portion of the first set of input data was read.

2. The method of claim 1, wherein the input data represents video data, and processing the first set of input data comprises performing a motion-compensation operation.

3. The method of claim 1, wherein the processing is performed by circuitry that is co-located with the first and second memory arrays on a single chip.

4. The method of claim 1, wherein the processing is performed by circuitry that is located within a first integrated circuit chip and the memory is located within at least a second integrated circuit chip.

5. The method of claim 2, further comprising transferring the first set of input data to a buffer memory prior to processing.

6. A method of storing and retrieving intermediate data for processing that includes recursive use of the intermediate data, comprising: determining a plurality of memory addresses for a video field stored in a memory; determining a plurality of memory addresses for each of a plurality of input columns, the input columns having a first width, the input columns at least partially overlapping the video field; determining a plurality of memory addresses for each of a plurality of output columns, the output columns having a second width, the output columns at least partially overlapping the video field; reading a first set of input data from a first input column; producing a first set of output data based at least in part upon the first set of input data; and writing the first set of output data to the first output column; wherein the width of the second width is less than the first width, and the first output column overlaps a portion of the first input column.

7. The method of claim 6, wherein producing a first set of output data comprises performing a motion-compensation operation.

8. The method of claim 6, wherein the first set of input data comprises video data.

9. The method of claim 8, wherein the first set of output data comprises motion-compensated video data.

10. A system for motion-compensated video scan rate conversion, comprising: processing circuitry; a memory coupled to the processing circuitry; a first memory array disposed within the memory; a second memory array disposed within the memory, the second memory array partially overlapping the first memory array; wherein the processing circuitry is adapted to read a first set of input data from a first portion of the first memory array, produce a first set of intermediate output data, and write the first set of intermediate output data to a first portion of the second memory array such that the first set of intermediate output data partially overlaps the first portion of the first memory array.

11. The system of claim 10, further comprising: a third memory array disposed within the memory; a fourth memory array disposed within the memory, the fourth memory array partially overlapping the third memory array; wherein the processing circuitry is adapted to read a first set of input data from a first portion of the third memory array, produce a second set of intermediate output data, and write the second set of intermediate output data to a first portion of the fourth memory array such that the second set of intermediate output data partially overlaps the first portion of the third memory array.

12. The system of claim 11, wherein the memory is external to the processing circuitry, and further comprising a buffer memory coupled between the memory and the processing circuitry.

* * * * *